United States Patent [19]
Hogg

[11] 3,823,757
[45] July 16, 1974

[54] APPARATUS FOR USE IN MOUNTING TIRES ON AND REMOVING TIRES FROM WHEEL RIMS

[75] Inventor: Derek Hogg, Sutton Coldfield, England

[73] Assignee: Dunlap Limited

[22] Filed: June 14, 1972

[21] Appl. No.: 262,745

[30] Foreign Application Priority Data
June 23, 1971 Great Britain.................... 29358/71

[52] U.S. Cl............................. 157/1.24, 144/288 A
[51] Int. Cl........................................... B60c 25/10
[58] Field of Search ......... 157/1.24, 1.1, 1.22, 1.17; 144/288 A

[56] References Cited
UNITED STATES PATENTS
3,238,989  3/1966  Silvestrani.......................... 157/1.24
3,557,861  1/1971  Duquesne.......................... 157/1.24

Primary Examiner—Al Lawrence Smith
Assistant Examiner—Harold P. Smith, Jr.
Attorney, Agent, or Firm—Stevens, Davis, Miller & Mosher

[57] ABSTRACT

Apparatus for use in mounting tires on and removing tires from wheel rims comprising a wheel supporting means which comprises three slideable and pivotal arms mounted between two rotatable coaxial plates which on being relatively rotated cause the arms to pivot and slide thereby gripping a wheel. The first plate is rotatably driven and the second plate is continuously engaged by braking means. Resilient means act on the second plate to increase the reaction force between the second plate and the braking means.

4 Claims, 1 Drawing Figure

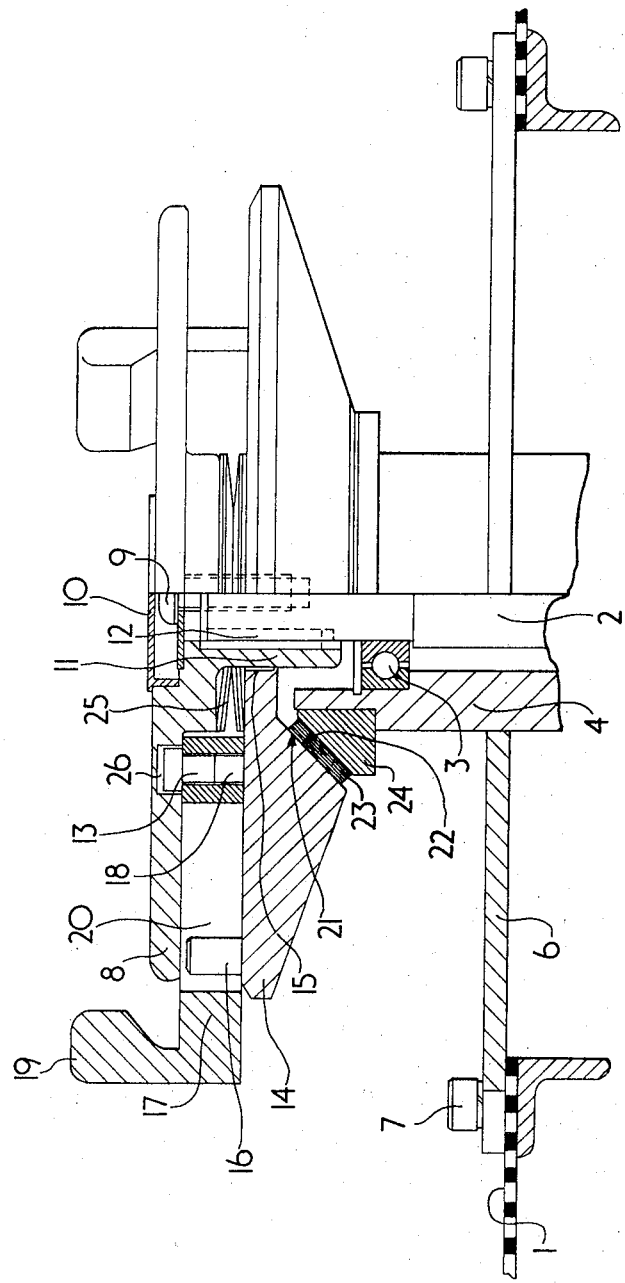

APPARATUS FOR USE IN MOUNTING TIRES ON AND REMOVING TIRES FROM WHEEL RIMS

This invention relates to apparatus for use in mounting tires on and removing tires from wheel rims.

In accordance with the invention apparatus for use in mounting tires on and removing tires from wheel rims includes a wheel supporting means comprising a drivably rotatable first plate, a rotatable second plate arranged coaxially with the first plate, a wheel rim gripping means comprising at least three arms each pivotally mounted at one end on one of said plates, the arms being in circumferentially-spaced-apart relationship and each being slidably and pivotally mounted on the other of said plates at a position intermediate its ends, braking means continuously engaging the second plate, resilient means acting on the second plate to increase the reaction force between the second plate and the braking means, and means for drivably rotating the first plate to cause relative rotation between the first and second plates whereby the arms are caused to pivot about their pivotally mounted ends such that their free ends remote from said pivotally mounted ends move either inwards or outwards, depending on the direction of the relative rotation, to become respectively engaged with or disengaged from a wheel rim.

Preferably the braking means comprises a stationary ring of friction material having a part-conical outer surface which engages on a frusto-conical surface on the second plate.

Preferably also the resilient means comprises spring means e.g. a plurality of dished annuli which are arranged coaxially with the plates and act on the surface of the second plate opposite to that engaged by the braking means.

One embodiment of the invention will now be described by way of example only with reference to the accompanying single FIGURE showing a part cross-section, part side view of the wheel supporting means of the apparatus.

The apparatus for mounting a tire on and removing a tire from a wheel rim comprises a housing enclosing a reversible electric motor drivably connected and a rotatable wheel supporting means located on a horizontal working surface of the housing. A vertical stand extends upwards from the surface and supports an arm to which is connected the tire engaging tool which effects the tire mounting or removal on to or from a wheel rim supported on the rotatable wheel supporting means. The arm may be slidably or pivotally attached to the stand about a vertical or horizontal axis, so that the tool may be readily moved between a parked position and the operative position when it is in engagement with the tire. The tool may be as disclosed in U.K. Pat. No. 1,215,805.

The wheel supporting means comprises a single unit supported on the working surface 1 of the housing. The unit comprises a vertical driving shaft 2 mounted by means of a bearing 3 coaxially within a hollow shaft 4 to which is welded at a position intermediate its ends a flat horizontal cover plate 6. This plate 6 covers a hole formed in the working surface 1 of the housing and is bolted to the surface at the edge of the hole. At the lower end of the driving shaft is provided a gear train in a sump attached to the hollow shaft 4, the driving shaft being rotatably driven through this gear train via a V-belt, and pulley wheel system by an electric motor located within the housing. The gear train, sump, motor, V-belt, pulleys and lower end of the hollow and driving shafts are not shown but are described and illustrated in copending U.S. application Ser. No. 251,083 filed May 8, 1972.

By undoing the screws 7 connecting the cover plate 6 to the housing and disengaging the V-belt from the pulleys the supporting means may be readily separated from the housing for servicing and/or repair.

The wheel supporting means also comprises an upper circular plate 8 bolted to the top of the driving shaft 2 by means of a recessed screw 9, the head of which is below the level of the top surface of the upper plate. A dust cap 10 is fitted over the screw head in the recess in the upper plate. An annular boss 11 is integrally formed with the underside of the upper plate 8 and located externally of the upper end of the driving shaft 2. A key 12 located in keyways on the exterior of the shaft and the other on the interior of the boss prevents relative movement of the shaft 2 and plate 8.

On the underside of the plate radially outwards of the boss are provided three circumferentially, equi-spaced-apart lugs 13, each the same distance from the axis of the driving shaft 2.

A lower circular plate 14 having a diameter slightly greater than that of the upper plate 8 and formed with a central hole 15 is disposed on the boss 11 coaxially and spaced apart from the upper plate 8. The boss 11 of the upper plate is a clearance fit in the central hole 15 so that the two plates may rotate relative to one another. Alternatively, a bearing may be provided between the lower plate 4 and the boss 11.

The lower plate 14 is provided on its upper surface adjacent its radially outer edge with three circumferentially equally spaced-apart upstanding lugs 16 and provides support for three horizontal wheel rim gripping arms 17 which are located between the upper and lower plates.

Each arm 17 is inclined at an angle with respect to the radial direction relative to the driving shaft 2 and is provided at its radially inner end with a threaded vertical hole 18 for the reception of a screw-threaded lug 13. Each lug 13, one in each arm 17, locates in one of three equi-spaced holes 26 provided on the underside of the upper plate 8. At its radially outer end each arm extends beyond the peripheries of the upper and lower plates and is formed with an upwardly extending wheel rim gripping claw 19 for engaging with the lower rim flange of a wheel disposed with its rotational axis vertical on the wheel supporting means. Intermediate their ends each arm 17 is provided with an elongated slot 20 which engages with one of the three upstanding lugs 16 on the lower plate 14. Relative rotation of the upper and lower plates causes the arms 17 to pivot about the lugs 13 engaging with the holes 26 on the underside of the upper plate and pivot and slide relative to the upstanding lugs 16 on the lower plate to cause the claws 19 to move arcuately inwards or outwards into or out of engagement with a wheel rim depending on the direction of relative rotation between the upper and lower plates.

The underside of the lower plate 14 is formed near its center with a frusto-conical surface 21 which is continuously engaged by the part-conical surface 22 of an annular ring 23 of friction material of the type used on brake or clutch linings.

This ring 23 is mounted on a backing ring 24 which is welded to the upper end of the hollow shaft 4. Alternatively, the ring 23 can be part of the hollow shaft 4, or can be keyed thereto by means of splines. This last construction allows the ring to be readily replaced if it becomes worn.

Located between the upper and lower plates on the boss 11 formed in the upper plate is a resilient means consisting of four dished washers 25 arranged in two pairs, the washers in each pair being in nesting engagement with one another, and the washers in one pair being reversed with respect to the washers in the other pair. The spacing between the upper and lower plates, adjustable by means of the bolt 9 connecting the upper plate 8 to the driving shaft 2 is such that the washers are compressed and provide a downwards force acting on the lower plate. This tends to increase the reaction force between the lower plate and the braking means consisting of the annular ring 23. The lower plate is thus continuously braked.

In use of the apparatus just described a wheel rim onto which a tire is to be mounted is placed on the upper plate 8 of the wheel supporting means. The motor is driven to rotate the shaft 2 in the direction in which the end of the arm nearer the shaft axis is leading with respect to the remainder of the arm. During the first part of the rotation the lower plate remains stationary on account of the braking action of the ring 23 of friction material and the dished washers 25, each arm thus being caused to slide and pivot about its respective upstanding lug 16 on the lower plate 14 and pivot about the lug 13 provided at its end nearer the shaft 2 on the underside of the upper plate to move the end of the arm formed with the claw 19 inwardly towards the wheel rim. This action continues until the claw engages with the rim of the wheel and when all three claws are engaged and the arms can no longer slide with respect to the lower plate the upper and lower plates are effectively locked together. The continuing rotational force of the motor then overcomes the braking force of the ring 23 and the dished annuli 25 and the lower plate and therefore the arms and wheel rotate. The frictional force exerted by the ring and dished annuli is such that a considerable clamping force is exerted on the wheel rim and the wheel continues to rotate while a tire is being mounted on the rim, e.g. in a manner as disclosed in the aforementioned U.K. Pat. No. 1,215,805, this mounting causing a drag force to be applied to the wheel.

To remove a tire from a wheel the action of the supporting means in clamping the wheel while the tool acts upon the tire is exactly similar to that just described.

To unclamp a wheel from the apparatus the motor is reversed, and the claws are thus caused to move outwards allowing the wheel and tire, if a mounting operation has been carried out, to be lifted from the apparatus.

An advantage of the supporting means just described is that the claws when engaging the wheel rim have a self-centering action so there is no need to provide a hub for the wheel. Further the ring 23 of friction material due to the part-conical shape of the surface is self-cleaning, any dirt or grease tending to drop down on the cover plate 6 from where it can be easily removed.

Having now described my invention, what I claim is:

1. Apparatus for use in mounting tires on and removing tires from wheel rims including a wheel supporting means comprising a drivably rotatable first plate, a rotatable second plate arranged coaxially with the first plate, a wheel rim gripping means comprising at least three arms each pivotally mounted at one end on one of said plates, the arms being in circumferentially-spaced-apart relationship and each being slidably and pivotally mounted on the other of said plates at a position intermediate its ends, braking means continuously engaging the second plate, resilient means acting on the second plate to maintain a reaction force between the second plate and the braking means, and means for drivably rotating the first plate to cause relative rotation between the first and second plates whereby the arms are caused to pivot about their pivotally mounted ends such that their free ends remote from said pivotally mounted ends move either inwards or outwards, depending on the direction of the relative rotation, to be respectively engaged with or disengaged from a wheel rim.

2. Apparatus according to claim 1 wherein the braking means comprises a stationary ring of friction material having a part conical outer surface and the second plate is formed with a frusto conical surface on which the said part conical outer surface engages.

3. Apparatus according to claim 1 wherein the resilient means comprises spring means.

4. Apparatus according to claim 1 wherein the resilient means comprises a plurality of dished annuli arranged coaxially with the plates so as to act on the surface of the second plate opposite to that engaged by the braking means.

* * * * *

UNITED STATES PATENT OFFICE
CERTIFICATE OF CORRECTION

Patent No. 3823757            Dated July 16, 1974

Inventor(s) Derek HOGG

It is certified that error appears in the above-identified patent and that said Letters Patent are hereby corrected as shown below:

On the title page, the name of the assignee should read --Dunlop Limited--.

Signed and sealed this 19th day of November 1974.

(SEAL)
Attest:

McCOY M. GIBSON JR.            C. MARSHALL DANN
Attesting Officer               Commissioner of Patents